(12) United States Patent
Zeng et al.

(10) Patent No.: US 6,367,272 B1
(45) Date of Patent: Apr. 9, 2002

(54) COMPRESSOR CAPACITY CONTROL SYSTEM AND METHOD

(75) Inventors: Xin Zeng, Auburn Hills; Gregory Alan Major, Beverly Hills, both of MI (US); Toyotaka Hirao, Nagoya (JP)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/576,520

(22) Filed: May 23, 2000

Related U.S. Application Data
(60) Provisional application No. 60/173,449, filed on Dec. 29, 1999.

(51) Int. Cl.[7] ............................. F25B 1/00; F25B 49/00
(52) U.S. Cl. ........................... 62/228.5; 62/193; 62/133
(58) Field of Search ..................... 62/133, 161, 228.3, 62/228.5, 193; 82/227

(56) References Cited

U.S. PATENT DOCUMENTS

| | | | | |
|---|---|---|---|---|
| 4,698,977 A | * | 10/1987 | Takahashi et al. ............. 62/133 |
| 4,748,819 A | * | 6/1988 | Takahasi et al. .............. 62/161 |
| 5,014,522 A | * | 5/1991 | Noji et al. ..................... 82/227 |
| 5,018,366 A | * | 5/1991 | Tanaka et al. ............... 62/228.5 |
| 5,117,643 A | * | 6/1992 | Sakurai et al. ................ 62/133 |
| 5,142,881 A | * | 9/1992 | Nagayama ................. 62/228.5 |
| 5,653,119 A | * | 8/1997 | Kimura et al. ............. 62/228.5 |
| 5,884,497 A | * | 3/1999 | Kishita et al. ................ 62/193 |
| 5,979,168 A | * | 11/1999 | Beekman ................... 62/228.5 |
| 6,145,329 A | * | 11/2000 | Brandon et al. ............. 62/133 |
| 6,233,957 B1 | * | 5/2001 | Hirao et al. ............... 62/228.3 |

FOREIGN PATENT DOCUMENTS

JP 5822832 * 8/1981 ............ F24F/11/02

* cited by examiner

Primary Examiner—Teresa Walberg
Assistant Examiner—Leonid M Fastovsky
(74) Attorney, Agent, or Firm—Christopher DeVries

(57) ABSTRACT

An apparatus and system for manipulating the air temperature within an interior compartment of a vehicle, the apparatus and system includes a HVAC system and an operating system. A compressor receives and circulates a gas through a heat exchanger in order to regulate the air within the vehicle. The compressor has a capacity control valve that is manipulated by the control system in response to a user setting.

16 Claims, 5 Drawing Sheets

COMPRESSOR CAPACITY CONTROL SYSTEM AND METHOD

This application claims the benefit of provisional application Ser. No. 60/173,449, filed Dec. 29, 1999 and entitled: Compressor Capacity Control System and Method. The contents of which are incorporated herein by reference.

The present invention is related to a HVAC system for use in an automobile. In particular, the HVAC system uses a compressor capacity control that enhances the overall efficiency of the compressor operation.

Background

Passenger comfort and fuel efficiency have set forth increasing demands on automotive heating, ventilating and air-conditioning (HVAC) systems. It is a primary goal of most HVAC systems to provide a more efficient means for providing climate control to an automobile.

As a result, newer and improved automotive HVAC systems are configured to make use of available energy sources without placing an additional load onto the vehicle system.

Moreover, and as vehicles become more fuel efficient, energy loading upon the vehicles operating system becomes a critical feature of design aspects.

This is particularly true in a hybrid vehicle. A Hybrid Vehicle is a vehicle that has two sources of propulsion. A hybrid electric vehicle (HEV) is a vehicle wherein one of the sources of propulsion is electric and the other source of propulsion may be derived from fuel cells or an internal combustion engine (ICE) that burns diesel, gasoline or any other source of fuel.

In particular, the HVAC system of an automobile utilizes a compressor that is either mechanically or electrically driven to circulate an automobile refrigerant to heat and or cool the interior passenger compartment of an automobile. Typically, the compressor is activated in response to a user demand such as a cooling request which will activate the compressor. In this system the compressor will be activated and/or deactivated in response to a user setting as well as a sensor placed within the vehicle compartment or in an appropriate location along the refrigerant line.

Accordingly, there is no control over the compressor operation other than its activation and deactivation which causes a significant load to be applied to the vehicles operating system.

Moreover, and referring in particular to compressors which are mechanically coupled to the automobile's engine, the operation of the compressor is directly proportional to the speed (RPM) of the vehicles engine. Accordingly, there is no separate control of the compressors operation other than switching it on and off. In addition, the highest amount of demand required from the compressor is generally at times when the automobile is at idle (i.e. traffic jams and city driving conditions), and accordingly, the engine's speed is lowest.

In a recent attempt to address this problem larger capacity compressors having their operational capacity limited by a compressor control valve were produced, however, these compressors still offered no means for varying the compressor capacity.

Therefore there is a need for control system wherein the operation of the compressor is optimized in order to minimize its operational load upon the vehicle as well as increased the overall efficiency of the compressor and the vehicle.

SUMMARY OF THE INVENTION

It is therefore an object of the invention to provide an improvement in the performance of a HVAC system of an automotive vehicle.

Another object is to provide a method and apparatus for supplementing and/or improving the HVAC system of an automotive vehicle.

Another object of the present invention is to provide a method and apparatus for improving the HVAC system of an automobile without affecting the energy load and accordingly the fuel efficiency of the automobile engine.

Another object of the present invention is to link the compressor control to the temperature control and ambient temperature. In this embodiment the temperature control defines the set point of airflow temperature in the HVAC unit in response to a user selection.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

Figure 1:
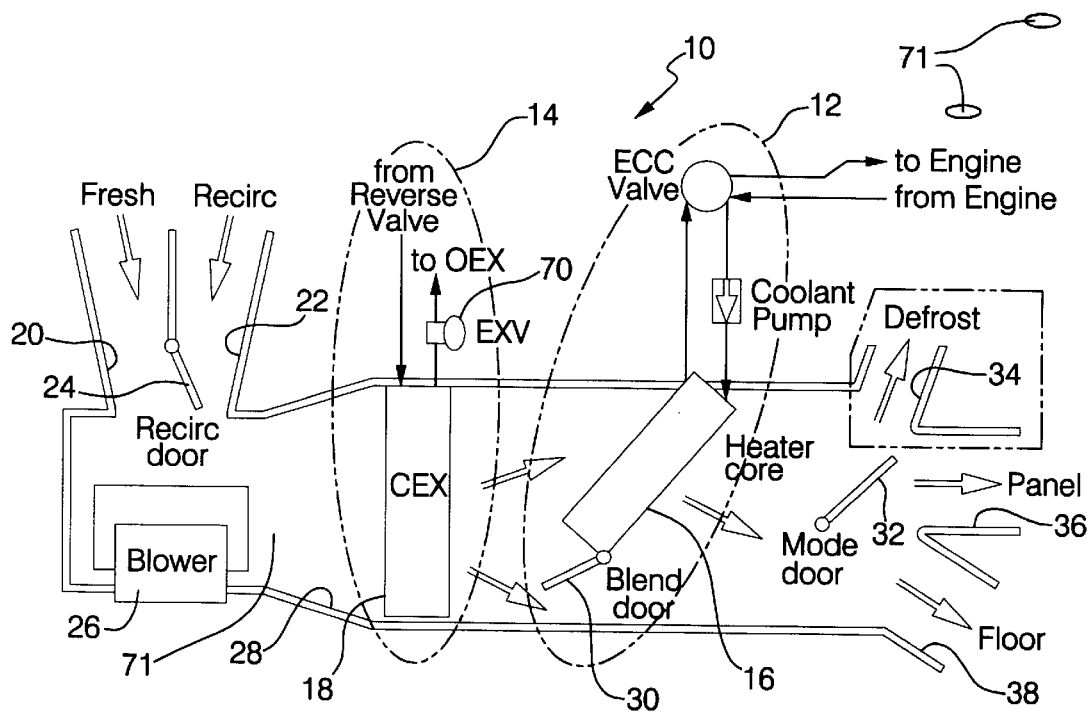
FIG. 1 is a diagrammatic view of a HVAC system.

Referring now to FIG. 1, a HVAC system 10 is illustrated. HVAC system 10 has a first heating loop 12 and a second heating loop 14. First heating loop 12 receives and circulates an engine coolant through a heater core 16. Second heating loop 14 provides heat and/or air conditioning to the vehicles interior through a cabin heat exchanger 18.

Generally, HVAC system 10 receives an air input from a fresh air passage 20 and a recirculation air passage 22. An air circulation door 24 controls the mixture of the fresh to recirculation air that is inputted into the system. A blower or fan 26 forces the fresh and/or recycled air into a main trunkline 28 that contains cabin heat exchanger 18 and heater core 16.

In accordance with the present invention, cabin heat exchanger 18 manipulates the air flowing through heating system 10 in accordance with the system settings.

Heater core 16 is positioned down stream from cabin heat exchanger 18. A blend door 30 is positioned to direct the air to and/or away from heater core 16 after it has passed through cabin heat exchanger 18.

A mode door 32 is positioned to direct the air or a portion thereof to a defog pathway 34, a panel pathway 36 or a floor pathway 38.

Figure 2:
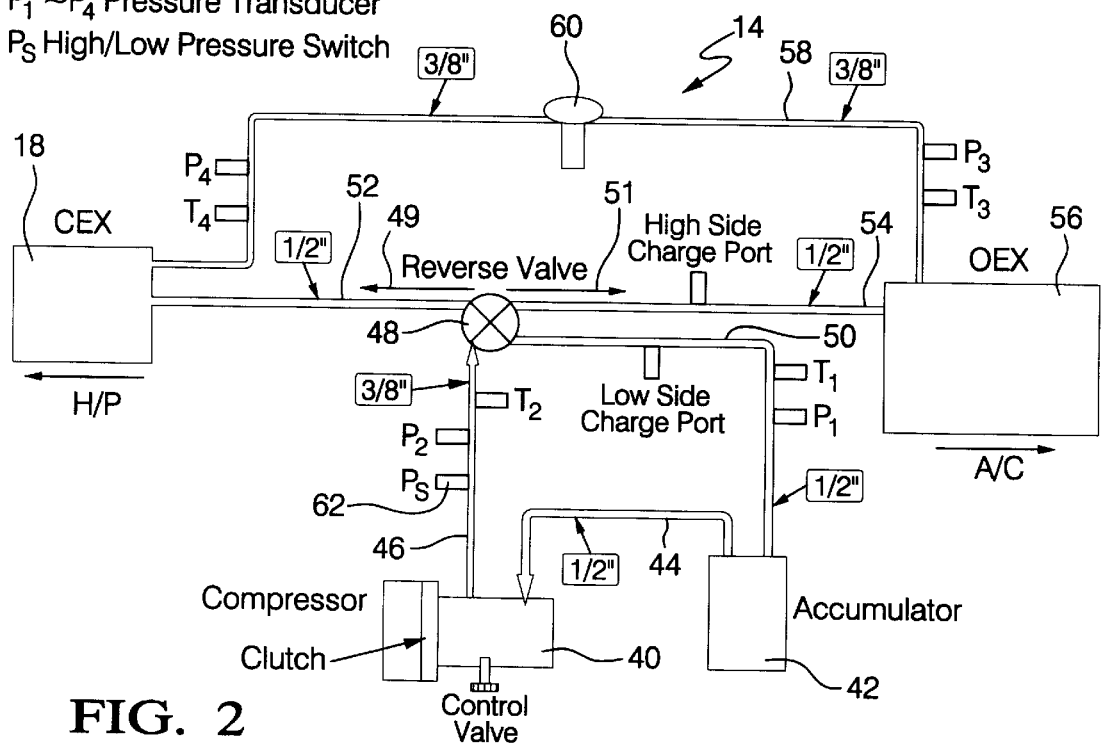
FIG. 2 is a diagrammatic view of a portion of the HVAC system illustrated in FIG. 1.

Referring now to FIGS. 1 and 2, HVAC loop 14 is illustrated. HVAC loop 14 heats and/or cools the air as it passes through trunkline 28.

A compressor 40 receives an automobile refrigerant from an accumulator 42. In the preferred embodiment, automobile refrigerant is an automobile refrigerant gas 134A, however, other gases such as carbon dioxide, ect. can be used.

A conduit 44 connects compressor 40 to accumulator 42. In the preferred embodiment conduit 44 is ½" in diameter and is constructed out of a rubber material having flexible characteristics. The flexible characteristics of conduit 44 allow compressor 40 to vibrate in accordance with normal operation procedures without damaging conduit 46 and without transferring the vibration and noise to the other parts of the system or vehicle.

Compressor 40 receives and compresses the automobile refrigerant gas, which in accordance with Boyle's law, causes the temperature and pressure of the automobile refrigerant to increase. Once the temperature and pressure of the automobile refrigerant has been increased to the desired temperature and pressure the automobile refrigerant is transferred through a conduit 46 to a reverse flow valve 48. The positioning of reverse flow valve 48 determines the flow of automobile refrigerant gas through HVAC loop 14. For example, if reverse flow valve 48 is set to a heating position the automobile refrigerant gas will flow in the direction of arrow 49. Conversely, if reverse flow valve 48 is set to an air-conditioning positioned the gas will flow in the direction of arrow 51.

In the preferred embodiment conduit 46 is ⅜" in diameter and is also constructed out of a flexible material such as rubber.

Reverse flow valve 48 is also connected to a conduit 50, a conduit 52 and a conduit 54.

Conduit 50 is connected to reverse flow valve 48 at one end and accumulator 42 at the other. In the preferred embodiment conduit 50 is also ½ inch in diameter and is constructed out of aluminum.

Conduit 52 is connected to reverse flow valve 48 at one end and cabin heat exchanger 18 at the other. Conduit 54 is connected to reverse flow valve 48 at one end and an outside heat exchanger 56 at the other end. In the preferred embodiment conduits 52 and 54 are ½ inch in diameter and are also constructed out of aluminum.

A conduit 58 is connected to cabin heat exchanger 18 at one end and outside heat exchanger 56 at the other. In the preferred embodiment conduit 58 is ⅜ of an inch in diameter and is also constructed out aluminum.

An electronic expansion valve 60 is positioned to provide a pressure drop that reduces the pressure of the automobile refrigerant and manage the flow rate of the refrigerant as it flows through conduit 58. A high low-pressure switch 62 is positioned to activate compressor 40.

Compressor 40 is supplied with a mechanical operational force through the use of a clutch mechanism (not shown) that is coupled to the vehicles drivetrain. Alternatively, compressor 40 can be driven by pair of pulleys and a belt wherein one of the pulleys is secured to the compressor and the other is secured to the vehicles engine or drivetrain.

Accordingly, and when the vehicle is operating second heat loop 14 receives some if not all of its required energy from the operational parts of the vehicle.

In situations where the automobile is not running, compressor 40 will derive its energy from an electrical source such as a battery.

This battery may be configured to receive a charge from a multipurpose unit (MPU) which is also configured to convert the mechanical force of the automobile's drivetrain into an electrical charge.

Figure 3:
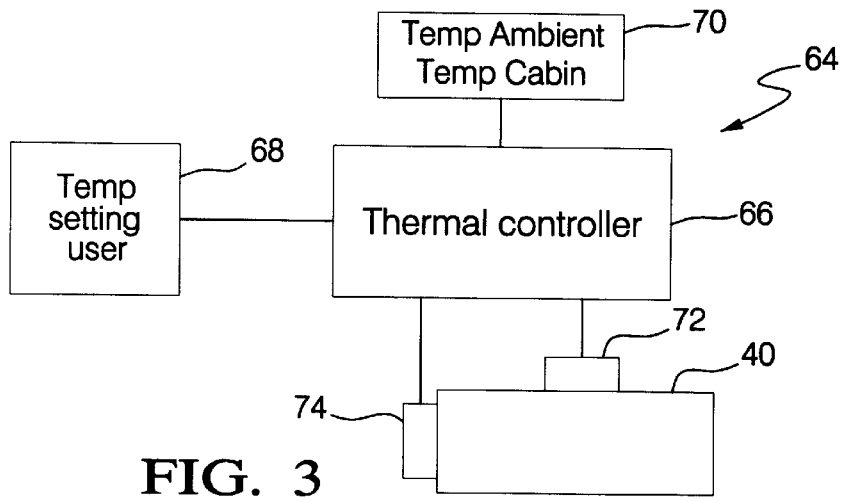
FIG. 3 is a diagrammatic view of a compressor and a compressor capacity control system.
Figure 4:
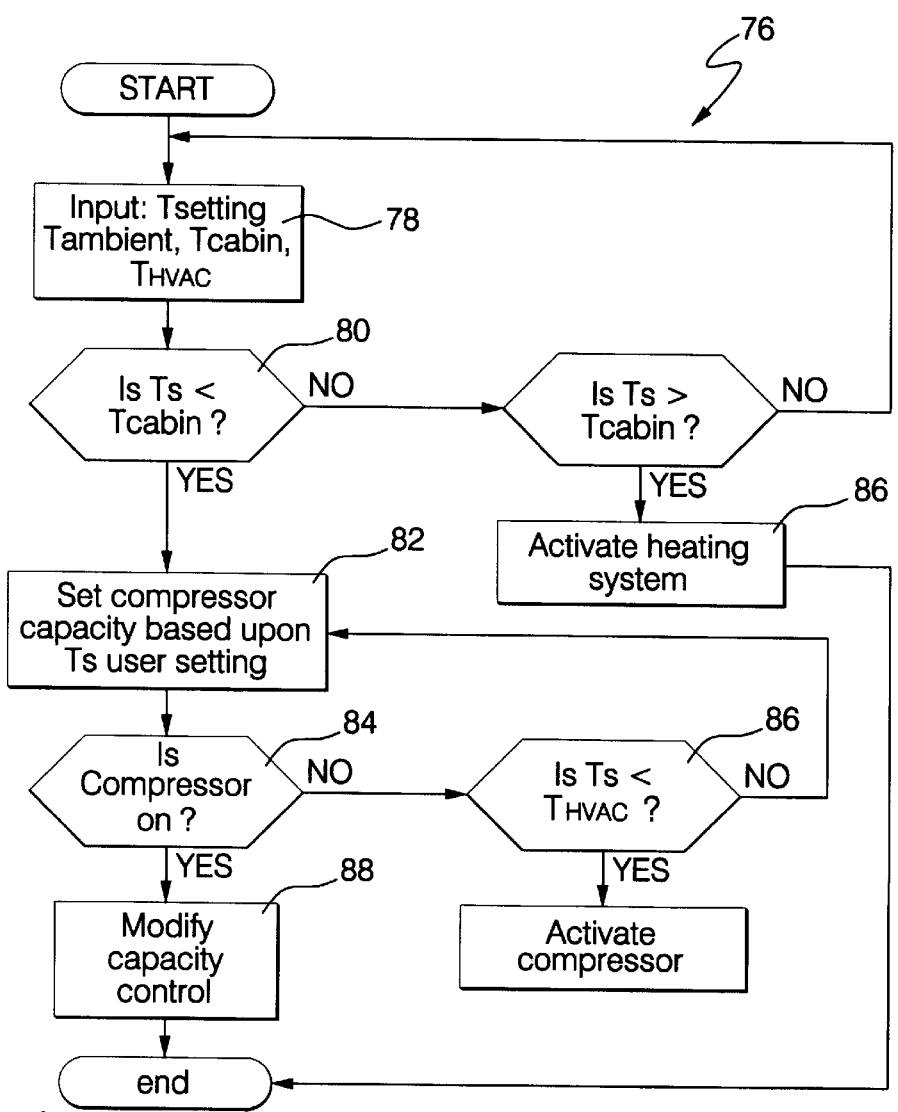
FIG. 4 is a flowchart illustrating a possible command sequence of the control system illustrated in FIG. 3.

Referring now to FIGS. 3 and 4, a diagrammatic view of compressor 40 and a compressor control system 64 are illustrated. A thermal controller 66 receives a climate control setting 68 and a system status 70. Systems status 70 is provided in the form of air temperature readings such as cabin temperature, ambient air temperature and the internal air temperature of the HVAC system. The aforementioned inputs in the form of air temperatures is inputted into thermal controller 66 by a plurality of temperature sensors 71 which are appropriately located to provide the corresponding air temperature, namely, cabin temperature, ambient air temperature and HVAC system air temperature. In particular, the sensor that provides the HVAC system air temperature is located within the ductwork of HVAC system 10.

Thermal controller 66 in response to the climate control requests and the environmental status determines the operational configuration of compressor 40. Compressor 40 has a capacity control valve 72 that is manipulated in response to the inputs received by thermal controller 66. Capacity control valve 72 provides a means for adjusting the capacity of compressor 40. For example, each revolution of compressor 40 will provide a known capacity in accordance with the setting of capacity control valve 72. In the preferred embodiment capacity control valve 72 is an internal mechanical by-pass piston that is mechanically manipulated in response to commands received from thermal controller 66.

A clutch mechanism 74 is coupled to the vehicles engine (not shown) through a pully and belt configuration (not shown) in order to provide a mechanical force for driving compressor 40. Alternatively, compressor 40 may be driven completely or in part by an electrical supply that is either provided by a generator and/or a battery system.

Referring now to FIG. 4, a flowchart illustrates a command sequence 76 used by controller 66 in order to vary the setting of compressor control valve 72 in response to the temperature setting of the HVAC system. Command sequence 76 may be performed by a computer algorithm which receives a plurality of inputs and in accordance with the value of these inputs, provides command requests to the automobiles HVAC system. An initial step 78 receives the following inputs: temperature control setting (i.e. the requested operation cooling or heating and temperature setting); the ambient air temperature (the internal cabin temperature and/or the external and the air temperature); and the air temperature within the HVAC system.

A second step or decision node 80 determines whether the users selected temperature setting is less than current cabin temperature. If so, a third step 82 sets capacity control valve 72 in accordance with the climate control system setting. In addition, and as an alternative, the setting of capacity control valve 72 may be based in part upon the systems air temperatures such as, ambient air temperature, HVAC air temperature and cabin air temperature. If, on the other hand, the temperature setting is greater than the cabin temperature a request for activation of the heating system is made.

A fourth step or decision node 84 determines the current compressor status (i.e. on/off). If the compressor is off a fifth step or decision node 86 determines if the temperature setting is less than the HVAC air temperature. If yes, the compressor is activated and the compressor capacity valve is appropriately set (sixth step 88) in accordance with the temperature request.

If on the other hand the compressor is currently active (i.e. dutch system engaged or running on electrical power) a sixth step 88 modifies the compressor capacity valve in accordance with the requested setting.

The airflow temperature in the HVAC unit, provided by one of the sensors 71, is a controlled variable that determines the actuation of the compressor clutch.

The temperature control setting also defines the low-pressure set point of the compressor control valve for air-conditioning (cooling) operation.

The low-pressure set point of the compressor control valve varies with either the ambient air temperature or a prescribed temperature difference based upon ambient temperature for heat pump (heating).

Typically, the compressor of prior systems either cycles on and off in response to an air conditioning request. In addition, and as an operational byproduct of these prior systems, the air-conditioning system may in response to an air-conditioning command request can over cool the air which in turn requires the automobiles heating system (utilizing either waste heat from the engine core or a heat pump system) in order to reheat the over cooled air. This process results in an inefficient use of the vehicles power system. In particular, and in situations where the heat pump system is used, and excessive amount of loading is applied to the vehicles electrical supply.

However, and as contemplated in the instant application, by controlling the capacity of the compressor in response to the air temperature setting of the cooling request, there is no overcooling of the air, and accordingly, there is no requirement for the over cooled air to be heated up.

In addition, and in order to limit the compressor start-up load and in order to improve the vehicle drivability as well as fuel efficiency the following operational protocols are incorporated into the command control system. First, and prior to the activation of compressor 40 the compressor capacity is limited to 30% this will limit the initial start-up load. Moreover, and in situations where the compressor capacity was at a value greater than 30% prior to its being deactivated, the capacity will be reset to an initial value of 30%. Of course, is contemplated that the initial start up value can be less than or greater than 30%. The initial start up value is, of course, dependent upon the loading requirements placed upon the vehicle at the initial start up value.

In addition, and prior to any increasing of the compressor capacity, a time constant of three seconds will be used as a time limit in order to prevent the increasing of the compressor capacity to a value other than 30% during the initial start up of compressor 40. Accordingly, and based upon the temperature control setting, if for example it is determined that 80% of the compressor capacity is required the compressor will run at 30% for at least three seconds prior to its capacity being increased and accordingly it's load upon the vehicle. Of course, it is contemplated in accordance with the instant application that the time delay for varying the capacity of the compressor may be greater or less than three seconds.

In addition, a minimum time constant of three seconds is used to define the period for which the capacity of compressor 40 may be increased from a minimum of 30% to a maximum of 100%.

Additionally, a deactivation time constant is used to limit the cycling (off/on) of the compressor, namely, the mechanical coupling of compressor 40 to the vehicles power supply and/or powertrain via a clutch mechanism or electrical source. In an exemplary embodiment, the deactivation time constant is at least 20 seconds. Therefore, the cycling or time interval in between the activation/deactivation of the compressor is at least 20 seconds. Of course it is contemplated in accordance with the instant application the time interval may be varied to be either greater or less than 20 seconds.

In addition, and in applications where the internal combustion engine of the vehicle is not always running (hybrid vehicle) the cycling and resetting of the compressor substantially contributes to be overall efficiency of the internal combustion engine as well as the initial loading upon the same. Accordingly, and in a hybrid mode or engine mode the engine speed varies in accordance with the torque commands, therefore, the capacity of the compressor is varied in accordance with the control setting in order to accommodate the variations of the engine speed into the capacity of the compressor.

Figure 5:
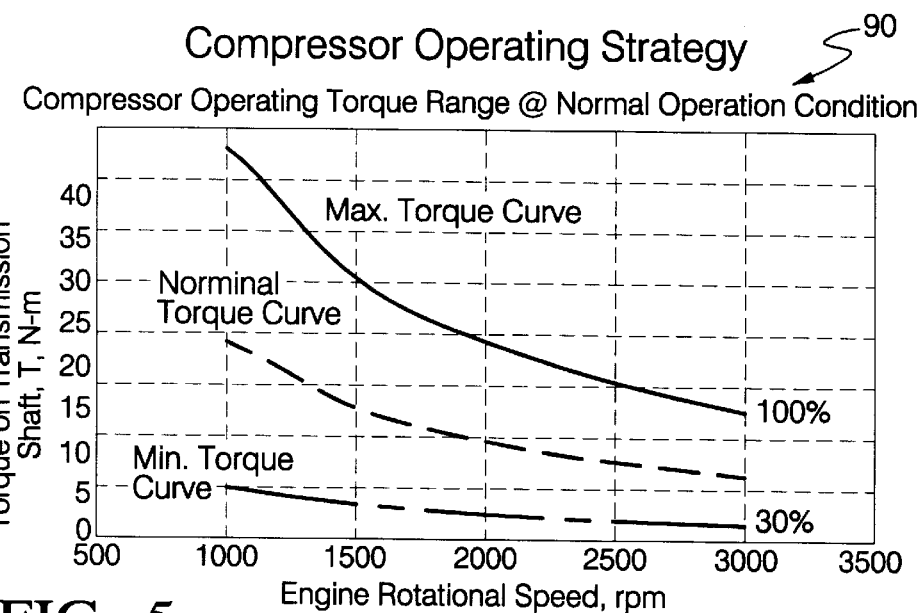
FIG. 5 is a chart illustrating compressor operational torque ranges at normal operation and conditions.

Referring, now to FIG. 5, a chart 90 illustrates the compressor operating torque range at normal operation conditions. The maximum torque curve illustrates a compressor wherein the compressor capacity control valve is at 100%. On the other hand the minimum torque curve illustrates compressor operation wherein the compressor capacity control valve is at 30%.

Figure 6:
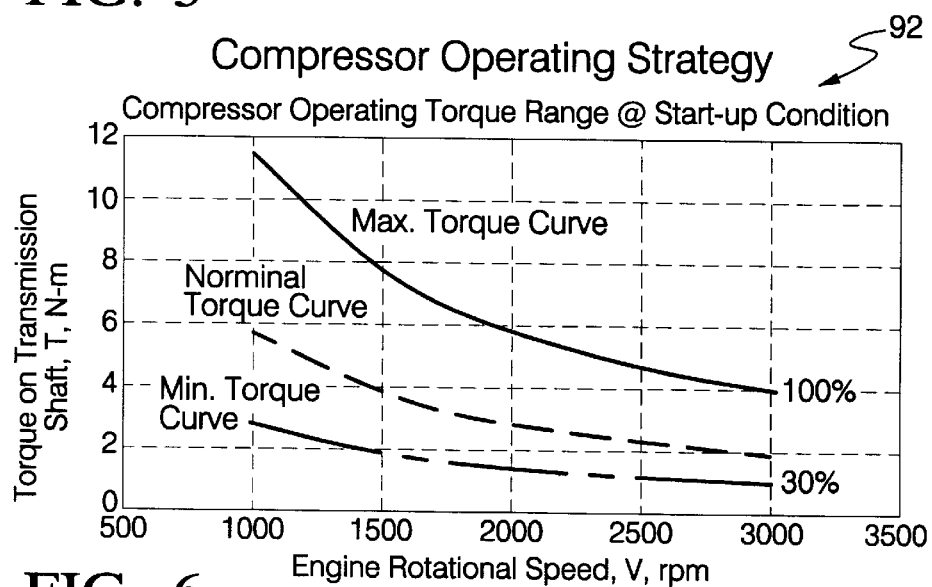
FIG. 6 is a chart illustrating compressor operational torque ranges at engine startup conditions.

Referring now to FIG. 6, a chart 92 illustrates the compressor operating torque range at startup conditions. The maximum torque curve illustrates a compressor wherein the compressor capacity control valve is at 100% while the minimum torque curve illustrates a compressor capacity control valve setting of 30%.

Figure 7:
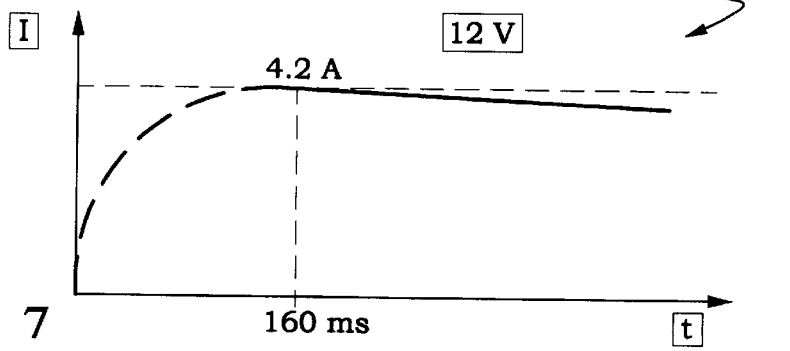
FIG. 7 is a chart illustrating the compressor clutches start-up characteristics.

Referring now to FIG. 7, a chart 94 illustrates the compressor startup characteristics as a function of current draw with respect to time.

Moreover, and in situations where the compressor is operating exclusively from an electrical supply such as the vehicles batteries, the compressor capacity is altered to provide the most efficient operation of the same.

Referring now to the capacity control valve in the variable capacity compressor, the setting value of suction pressure is determined by an embedded control algorithm and carried out by capacity control valve (CCV) 72. The CCV consists of a stepping motor and valve elements, which is designed to promptly change compressor capacity in response to the external demands. There is a power saving feature in the CCV design. Power is consumed only when the stepping motor is energized to drive the CCV to a new position; no power is required after the target position has been achieved. Operating the CCV establishes a control baseline for the suction pressure setting. This setting value is a function of ambient conditions and the selections of operators.

Figure 8:
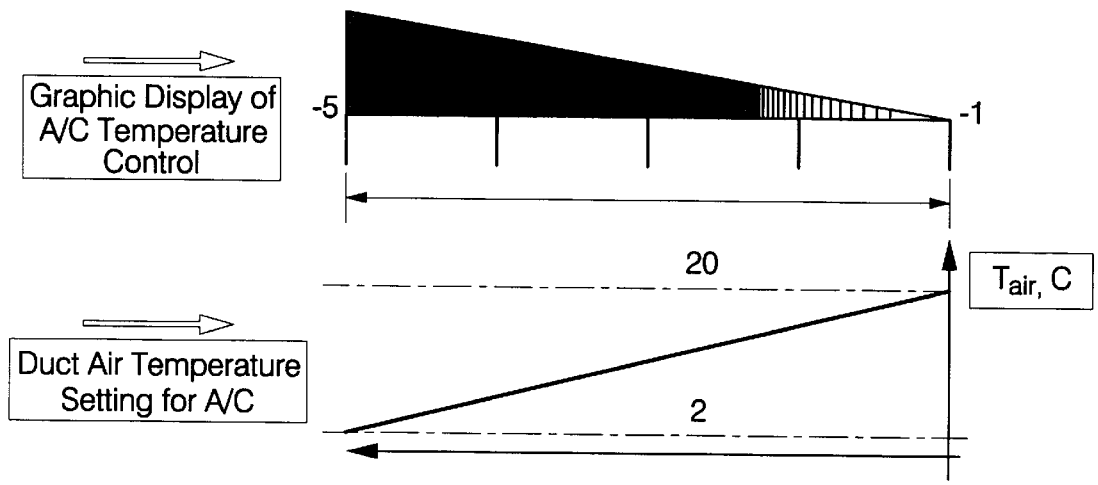
FIG. 8 illustrates compressor control for an air condition operation.
Figure 9:
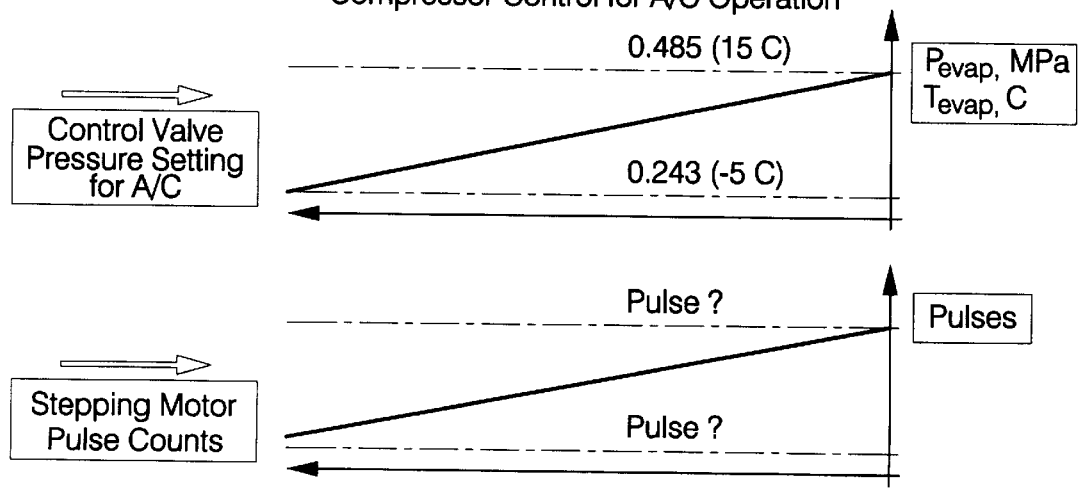
FIG. 9 illustrates compressor control for an air condition operation.

Accordingly, the compressor control can be linked to the ambient conditions. For example, and during A/C operation and referring now to FIGS. 8 and 9, the figures show the logic linkage from the customer selection (stage −1 to stage −5) on the A/C temperature control, to duct discharge air temperature settings (20 C to 2 C, linearly), then to saturated refrigerant pressure settings at compressor suction line (eg., 0.485 Mpa to 0.243 Mpa, the corresponding saturated refrigerant temperatures: 15 C to −5 C), finally to a pulse count, which can readily be calibrated. For example, if an operator selects temperature control to stage −5, then the discharge air temperature should equal 2 C. In order to obtain the 2 C air temperature, the saturated refrigerant pressure should be set to 0.243 Mpa or the saturated refrigerant temperature should be set to −5 C. In order for the saturated pressure or temperature to be set to the value, the CCV should be driven by the stepping motor to a certain position. As a result, the controller or the control algorithm should send a command (pulse count) to the stepping motor so that the stepping motor drives the valve mechanism to a certain position.

Figure 10:
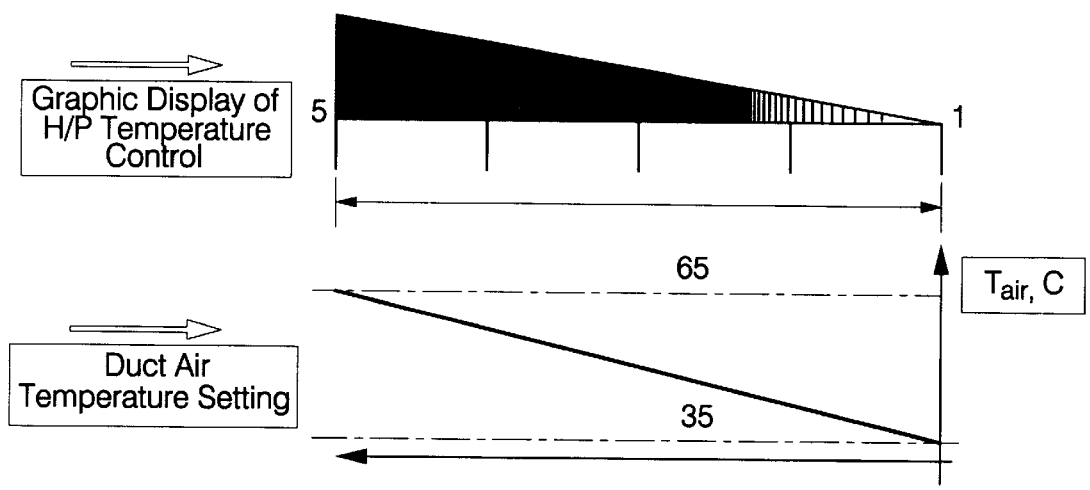
FIG. 10 illustrates compressor control for a heating operation.
Figure 11:
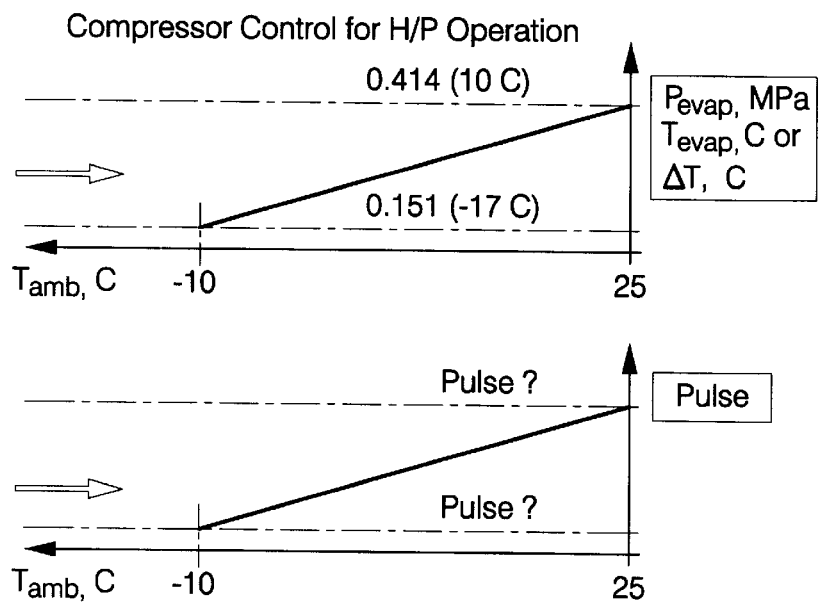
FIG. 11 illustrates compressor control for a heating operation.

During a heating operation and referring now to FIGS. 10 and 11, which show the logic linkage from the customer selection (stage 1 to stage 5) on the heating temperature control, to duct discharge air temperature settings (35 C to 65 C, linearly). It should be pointed out that the saturated refrigerant pressure or temperature is correlated to the ambient temperature condition since the ambient temperature is a major limit factor to the heat pump operation. As we can see from FIGS. 10 and 11, the saturated pressure varies with the ambient temperature linearly, the setting values are: 0.151 Mpa (or −17 C) @ ambient temperature=−10 C and 0.414 Mpa (or 10 C) @ ambient temperature=25 C. Also, the pulse count from the controller to the stepping motor is determined by the ambient temperature, as indicated in FIGS. 10 and 11.

It is noted that input variables to the controller could extend to include the position of temperature control lever and blower speed selection in control head, and ambient condition, etc. The outputs to the compressor are clutch cycling command and CCV pulse setting. Discharge air temperature is used as a controlled variable to determine the engagement or disengagement of the clutch. Based upon the CCV setting, the compressor then acts to achieve and maintain the given suction pressure by mechanically varying the capacity control mechanism in the inner control loop. This control scheme not only reduces the complexity of the A/C system control but it also improves the passenger comfort level and increases the vehicle fuel economy by reducing the clutch cycling frequency and eliminating re-heating process. The control logic sequence is outlined as follows:

(1) Define a set point of the discharge air temperature based upon ambient condition and operator selected temperature input. This temperature input could be either a numerical or an analogue value displayed on the control header;

(2) Define discharge air temperature control band that serves as clutch cycling control criterion;

(3) Define a CCV setting based upon the set point of discharge air temperature and blower speed selection. This setting gives a baseline suction pressure;

(4) Compressor capacity control responds to the suction pressure setting;

(5) Clutch cycling control responds to the discharge air temperature.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus and system for manipulating the air temperature within an interior compartment of a vehicle, said apparatus comprising:

a) a variable capacity compressor being configured to provide a refrigerant for cooling the air temperature;

b) a compressor capacity control valve having a stepper motor being configured to manipulate the capacity of said compressor; and c) an operating system for controlling said stepper motor to manipulate said compressor capacity control valve in response to the temperature setting of said apparatus.

2. A method of controlling the capacity of a compressor in a heating ventilating and air-conditioning system of an automobile, comprising:

a) inputting a control setting into a control system;

b) manipulating a capacity control valve of said compressor with a stepper motor in accordance with said control setting;

c) comparing said control setting to a first temperature reading; and d) activating said compressor if said first temperature reading is not equal to said control setting.

3. A method of controlling a variable capacity compressor of a motor vehicle's HVAC system, said method comprising:

a) defining a set point of the discharge air temperature of said HVAC system, said set point being based upon an ambient condition and an operator selected temperature input;

b) defining a discharge air temperature control band that serves as a clutch cycling control criterion;

c) defining a capacity control valve setting that defines a baseline suction pressure, said capacity control about setting is based upon said set point of the discharge air temperature and a blower speed selection;

d) controlling a stepper motor to set said capacity control valve in response to said suction pressure setting; and e) cycling said compressor in response to the discharge air temperature.

4. The method as in claim 3, wherein the temperature input is a numerical value displayed on a control panel.

5. The method as in claim 3, wherein the temperature input is an analogue value displayed on a control panel.

6. The method as in claim 3, wherein the cycling of said compressor is controlled by an operational protocol wherein the compressor capacity is limited to 30 percent at each additional startup.

7. The method as in claim 6, wherein the capacity of the compressor is not increased until a time value has expired.

8. The method as in claim 7, wherein said time value is at least three seconds.

9. A compressor for use in an automotive HVAC system, said compressor comprising:

a) a capacity control valve being controllable by a stepper motor in response to inputs received by a thermal controller, said inputs including air temperature readings and a user setting.

10. The compressor as in claim 9, wherein said thermal controller employs a computer algorithm in order to control said stepper motor to manipulate said capacity control valve.

11. The compressor as in claim 10, wherein said user setting is inputted into a set computer algorithm in order to define a low-pressure set point on said compressor control valve.

12. The compressor as in claim 11, wherein said low-pressure set point is dependent upon an ambient air temperature.

13. The method as in claim 3, wherein a deactivation time constant is used to control the cycling of said compressor.

14. The method as in claim 13, wherein said deactivation time constant is at least 20 seconds and the cycling interval of said compressor is at least 20 seconds.

15. A method of controlling a variable capacity compressor of a motor vehicle's HVAC system, said method comprising:
   a) defining a set point of the discharge air temperature of said HVAC system, said set point being based upon an ambient condition and an operator selected temperature input;
   b) converting said set point into a pulse for driving a stepping motor of a capacity control valve of said compressor;
   c) defining a discharge air temperature control band that serves as a clutch cycling control criterion;
   d) defining a capacity control valve setting that defines a baseline suction pressure, said capacity control about setting is based upon said set point of the discharge air temperature and a blower speed selection;
   d) setting said capacity control valve in response to said suction pressure setting; and
   e) cycling said compressor in response to the discharge air temperature.

16. The method as in claim 3, wherein said capacity control setting includes a pulse count for said stepper motor, said pulse count setting a limit for said capacity control valve.

* * * * *